United States Patent
Houlihan et al.

(10) Patent No.: US 7,882,216 B2
(45) Date of Patent: Feb. 1, 2011

(54) PROCESS AND METHODOLOGY FOR GENERIC ANALYSIS OF METRICS RELATED TO RESOURCE UTILIZATION AND PERFORMANCE

(75) Inventors: John Richard Houlihan, Round Rock, TX (US); Dilton Monroe McGowan, II, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 11/766,544

(22) Filed: Jun. 21, 2007

(65) Prior Publication Data

US 2008/0320123 A1 Dec. 25, 2008

(51) Int. Cl.
G06F 15/16 (2006.01)
G06F 15/173 (2006.01)
G06F 9/46 (2006.01)

(52) U.S. Cl. .................. 709/224; 709/215; 718/101; 718/102; 718/103

(58) Field of Classification Search .............. 718/101, 718/102, 103; 709/215, 224
See application file for complete search history.

(56) References Cited

U.S. PATENT DOCUMENTS

| | | | |
|---|---|---|---|
| 6,148,335 A | 11/2000 | Haggard et al. | |
| 2004/0054999 A1* | 3/2004 | Willen et al. | 718/103 |

OTHER PUBLICATIONS

VMware , Overview, pp. 1-2, retrieved Apr. 9, 2007 http://www.vmware.com/products/vi/vc/vmotion.html.

VMware ESX Server, VirtualCenter, and VMotion on Dell PowerEdge Servers, pp. 63-68, retrieved Apr. 9, 2007 http://www.vmware.com/pdf/esx_vc_vmotion.pdf.

Server virtualization, pp. 1-6, retrieved Apr. 9, 2007 http://searchservervirtualization.techtarget.com/tip/0,289483,sid94_gdci1188946,00.html.

Softricity, 1 p., retrieved Apr. 10, 2007 http://www.softricity.com/index.html.

Appistry—At the Convergence of Grid Computizing, Virtualization and SOA, 1 page, http://www.appistry.com.

Appsonic—next generation software deployment, 1 page, http://www.appsonic.com.

Berry, "Algorithm for General Diagnosis Involving Historical Performance Data", IBM Technical Disclosure Bulletin, pp. 479-480, Jul. 1995, vol. 38, No. 7.

(Continued)

Primary Examiner—George C Neurauter, Jr.
Assistant Examiner—Anish Sikri
(74) Attorney, Agent, or Firm—Yee & Associates, P.C.; Justin M. Dillon

(57) ABSTRACT

A generic algorithm for analysis of resource metrics. A threshold is calculated in a stack tier policy for the performance state of a metric in a virtualized process collection (VPC). Responsive to determining that the metric is a critical metric, a weighted average of all metrics in the VPC is determined. Responsive to determining that the weighted average exceeds the threshold in the stack tier policy, if the value of the metric is determined to be higher than values for all recorded metrics, the value of the metric is stored as a highest value. A weighted average performance state of all metrics is calculated as the weight property of the performance metric divided by the weight factor total. Responsive to determining that the highest value is higher than the weighted average performance state of all metrics, the highest value is used as the performance state of the VPC.

9 Claims, 13 Drawing Sheets

OTHER PUBLICATIONS

U.S. Appl. No. 11/689,034, filed Mar. 21, 2007, Fried et al.
U.S. Appl. No. 11/689,214, filed Mar. 21, 2007, Fried et al.
U.S. Appl. No. 11/766,517, filed Jun. 21, 2007, Houlihan et al.
U.S. Appl. No. 11/766,545, filed Jun. 21, 2007, Houlihan et al.

* cited by examiner

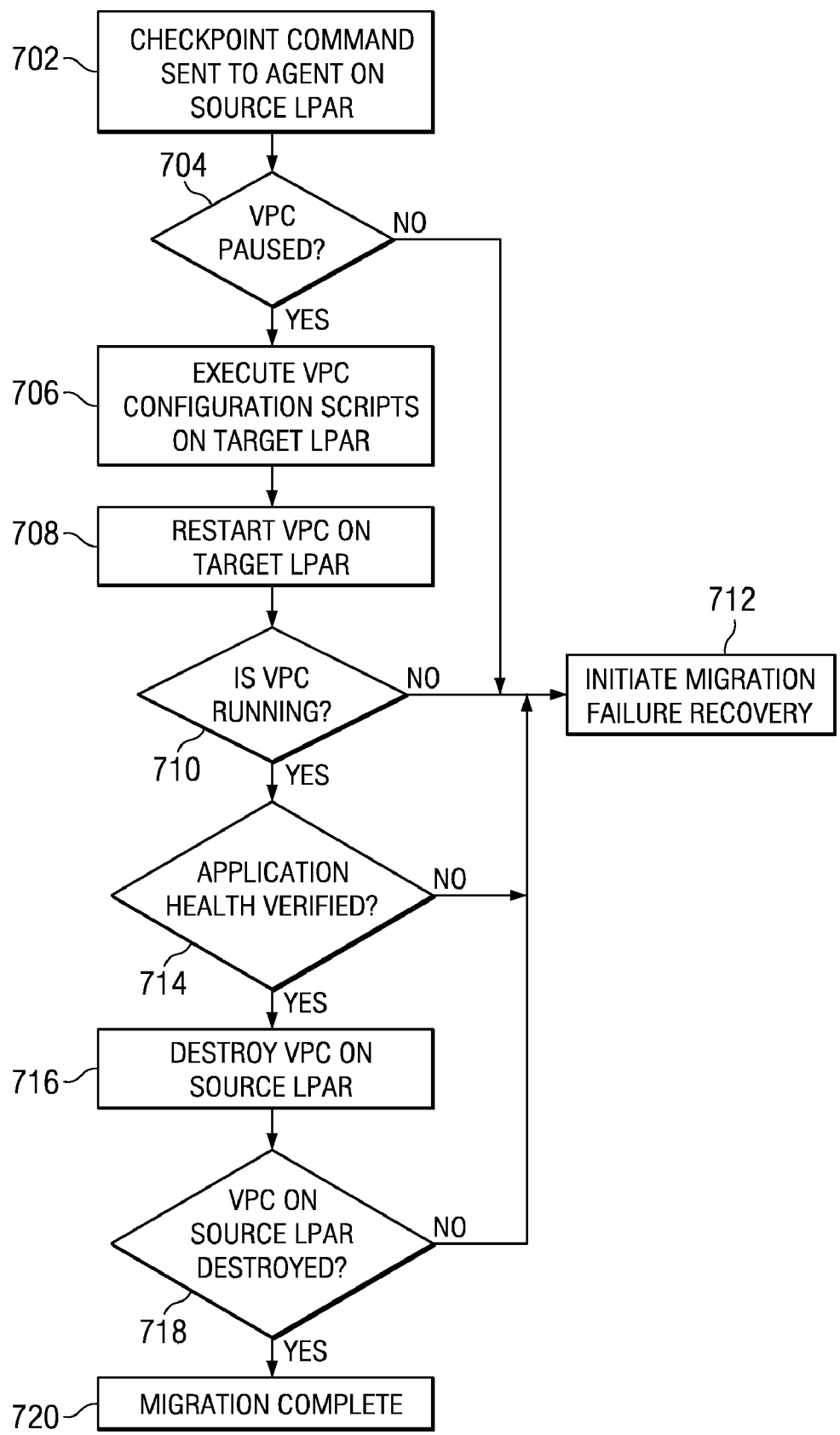

PROCESS AND METHODOLOGY FOR GENERIC ANALYSIS OF METRICS RELATED TO RESOURCE UTILIZATION AND PERFORMANCE

BACKGROUND OF THE INVENTION

1. Field of the Invention

The present invention relates generally to an improved data processing system, and in particular to a computer implemented method, data processing system, and computer program product for providing a generic algorithm for analysis of resource metrics which allows complex policies to be built from a collection of metric definitions defined at runtime.

2. Description of the Related Art

A virtualized process collection (VPC) is an assembly of processes which comprise the runtime instance of a specific application, such as Websphere or DB2, deployed within a logical partition of an operating system. This collection can also be described as a container which can be relocated or migrated between logical partitions (LPARs). In some systems, these virtualized process collections may be migrated from one server or physical device to another (i.e., mobility operation) to allow for load balancing the processes across the system.

Virtualized process collections can be moved manually under administrative control or using a system capable of moving the collections automatically. The latter is the most flexible approach. The ability to move virtualized process collections results in a data center that behaves rapidly to changes in its resource usage characteristics without the intervention of operators or administrators in most cases. This dynamic mobile application environment is referred to as "Utility Computing" (UC). Utility Computing is concerned with the management of virtualized process collections, with the focus on mobility to achieve a highly dynamic data center.

Examples of virtual server migration technologies include AIX® Workload Partition (WPAR), Linux® Workload Partition (WPAR), EMC's V-Motion™, and the Xen Virtual Management (VM) Console. A Workload Partition (WPAR) instance is a portion or representation of a system within an operating system. A virtualized process collection can be defined as the collection of processes running within a virtual server partition. A Workload Partition defines the container for a virtualized process collection. Other containers for a virtualized process collection may include a VMWare partition or a Xen VM instance.

When migrating a process from a source system to a target system, such as from one server or physical device to another or from one system partition to another partition within the same server, some current virtual server solutions such as EMC's V-Motion™ and the Xen VM Console do not allow for automatic migration, providing only manually triggered mobility and leaving target selection completely up to the user. Other virtual server mobility technologies, such as the AIX® and Linux® WPAR products, provide the ability for automatically migrating a WPAR instance to another partition. However, automation of virtual server technologies requires some sort of mechanism to rank available target server partitions for migration to ensure that the partition with the most appropriate performance characteristics is selected as the migration target based on the current performance state of the WPAR or virtual machine instance.

SUMMARY OF THE INVENTION

The illustrative embodiments provide a computer implemented method, data processing system, and computer program product for a generic algorithm for analysis of resource metrics which allows complex policies to be built from a collection of metric definitions defined at runtime. A threshold is calculated in a stack tier policy for a performance state of a metric in the virtualized process collection. Responsive to determining that the metric is a critical metric, a weighted average of all metrics in the virtualized process collection is determined. Responsive to determining that the weighted average exceeds the threshold in the stack tier policy, if the value of the metric is determined to be higher than values for all recorded metrics, the value of the metric is stored as a highest value. A weighted average performance state of all metrics is calculated as the weight property of the performance metric divided by the weight factor total. Responsive to determining that the highest value is higher than the weighted average performance state of all metrics, the highest value is used as the performance state of the virtualized process collection.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart illustrating a process for virtualized process collection migration in accordance with the illustrative embodiments;

DETAILED DESCRIPTION OF THE PREFERRED EMBODIMENT

Figure 1:
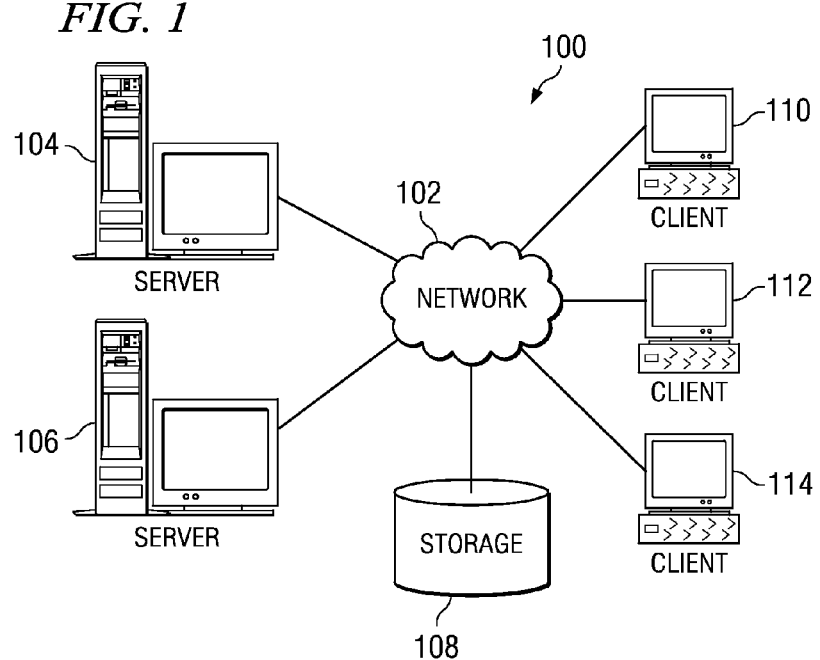
FIG. 1 depicts a pictorial representation of a distributed data processing system in which the illustrative embodiments may be implemented.
Figure 2:
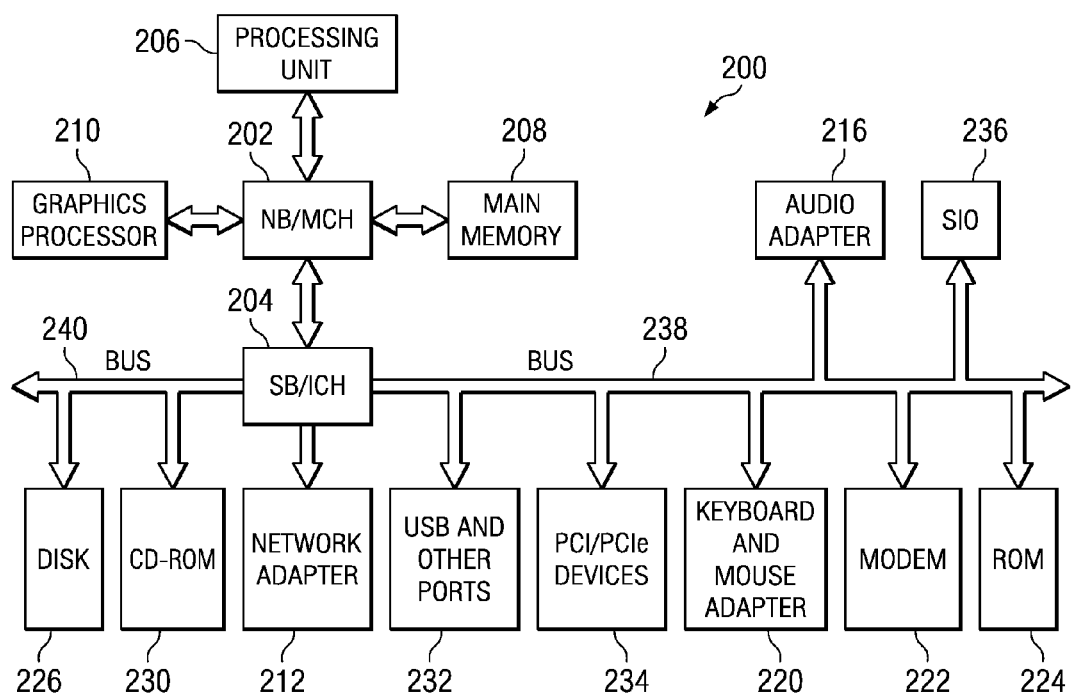
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a mechanism which provides for management of virtualized process collections. A management software approach in the form of a Virtualized Process Collection (VPC) Manager is provided to enable automatic and dynamic migration of applications running within the virtualized process collections. The term "automated" in this context may be described as a system running fully unattended. The term "dynamic" is used to describe policy driven management based on system events. The illustrative embodiments also allow the state of the migrating application to be retained, including the connection state, during the migration operation.

The illustrative embodiments also provide a generic algorithm for analysis of resource metrics which allows complex policies to be built from a collection of metric definitions defined at runtime. The generic algorithm is deployed to analyze a generic collection of resource metrics associated with resource and application usage on a processing grid and rank the resources by prioritized policy for workload migration. These resource metrics are provided to a correlation engine within the VPC Manager. Within the correlation engine, this generic model enables a flexible implementation for consumption, ranking, and weighting of performance analysis criteria, which is completely independent of metric reporting schema. The implementation of this generic algorithm reduces product maintenance requirements and simplifies policy creation by enabling complex policies to be based on historical performance data, the schema of which is not known at design time and may change anytime after product deployment.

The generic algorithm defines a mechanism to correlate a collection of performance metrics based on common property values assigned to each metric. These property values comprise metadata which describe the metrics. This metadata includes a weight property, limit property, critical property, and maximum property. A weight property is a float indicating the relative weight to be assigned for a particular metric. A limit property is a float describing the highest expected value allowed for the metric. A critical property is a boolean indicating whether the metric indicates a critical monitor value. A maximum property is a float describing the policy trigger value for the metric. Metrics describing some aspect of a condition are represented as either a numeric rate or a percentage value representing a meaningful data point. The correlation engine normalizes rates into percentages using the limit property and then performs averaging based on the weight assigned to specific metric objects for a particular policy. Additional properties of a metric include the critical and maximum properties, which enable the correlation engine to indicate critical readings on specific metrics or override calculated threshold values with individual metric values that are out of expected range.

The illustrative embodiments further provide a Target Ranker which leverages the policies built using the generic algorithm to enable ranking of server partitions based on current virtualized process collection performance state. A Target Ranker designed into the VPC Manager addresses the need for target partition ranking to facilitate on-demand allocation of server resources in an automated data center environment. Server partitions are ranked accordingly depending on the needs of a specific virtualized process collection, i.e. whether or not the virtualized process collection is experiencing high demand for services deployed within the collection. The partition ranking exercise may be executed by a user to facilitate the selection of server partition targets at runtime. This ranking is referenced when the need for a migration event is determined, and a filter is applied based on the rank of the current server profile for the virtualized process collection to limit the list of available server partitions to the appropriate servers which are available for a virtualized process collection migration event. The performance state of all server partitions is analyzed based on a tier policy created using the generic algorithm described above. The server partition with the lowest current performance state calculated using the tier policy is selected, and if the current performance state of that server partition is below the "idle threshold" (meaning there is enough overhead on the system to accommodate the virtualized process collection to be migrated), then the migration event is processed.

Figure 3:
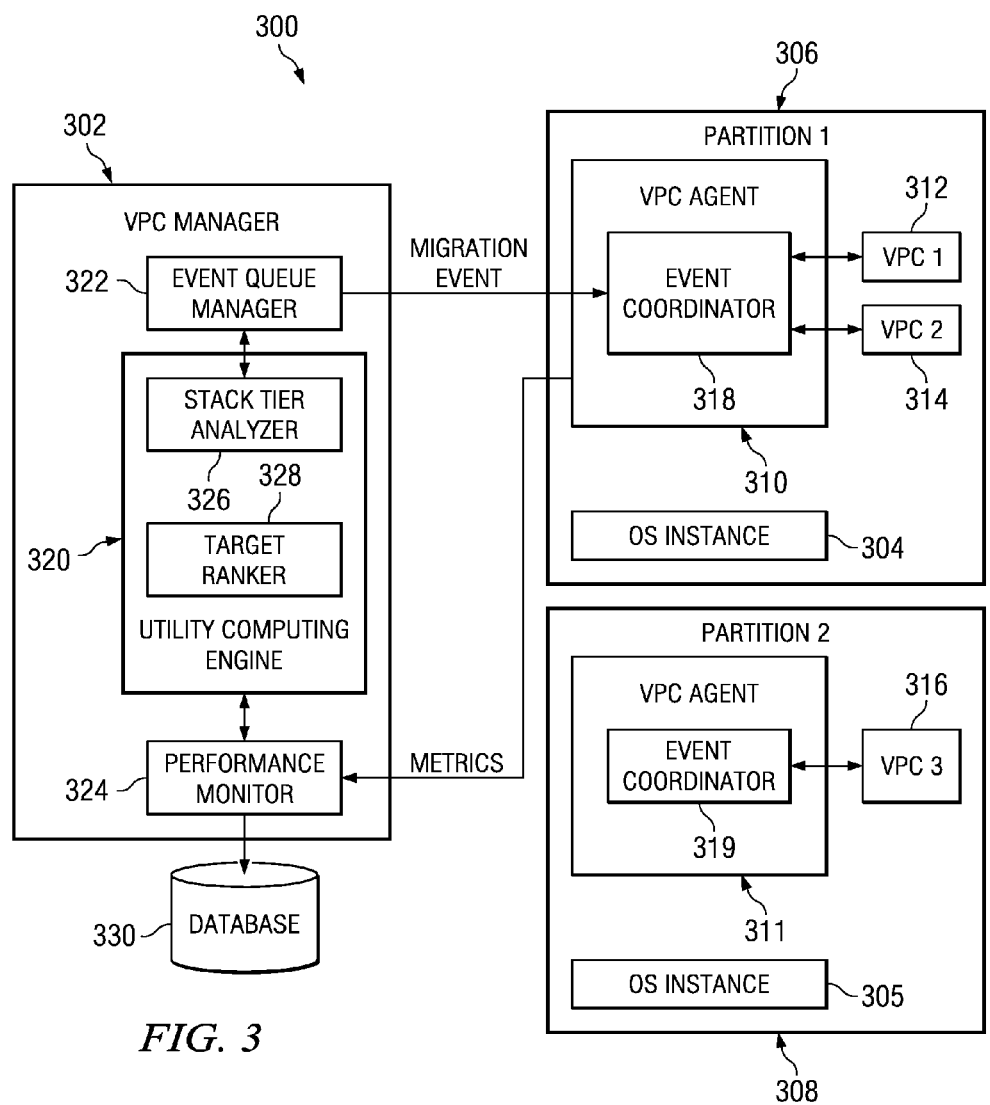
FIG. 3 is an exemplary diagram of a mobile application environment in which the illustrative embodiments may be implemented.

FIG. 3 is an exemplary diagram of a mobile application environment in which the illustrative embodiments may be implemented. Mobile application environment 300 may be implemented in, for example, data processing system 100 in FIG. 1. In this illustrative example, mobile application environment 300 includes VPC Manager 302 and logical partitions (LPAR) 1 306 and 2 308. VPC Manager 302 may reside in a management server in the data processing system, such as data processing system 100 in FIG. 1.

Partition 1 306 is shown to contain an Operating System (OS) instance 304, Virtualized Process Collection (VPC) Agent 310, and two virtualized process collections, VPC 1 312 and VPC 2 314. Partition 2 308 is shown to comprise an Operating System (OS) instance 305, Virtualized Process Collection (VPC) Agent 311, and one virtualized process collection, VPC 3 316. In this particular example, partitions 1 306 and 2 308 are implemented using AIX®, which is designed to interface with a WPAR management firmware, such as VPC Manager 302. AIX® is used only as an example in these illustrative embodiments. Other types of operating systems, such as OS/400® and Linux®, may also be used depending on the particular implementation.

As previously mentioned, a virtualized process collection is an assembly of processes which comprise the runtime instance of a specific application deployed within a logical partition of an operating system. VPC Agent 310 monitors virtualized process collections VPC 1 312 and VPC 2 314, and VPC Agent 311 monitors virtualized process collection VPC 3 316. The VPC Agents collect runtime usage metrics about these virtualized process collections. These runtime usage metrics comprise metrics related to performance state of a virtualized process collection, such as CPU, memory total, and network traffic rate, among others. The CPU metric is the percentage of CPU consumed by the virtualized process collection. The memory total metric is the total amount of memory used by the virtualized process collection or the percentage of system memory consumed by the virtualized process collection. The network traffic rate is the throughput rate of the connections of virtualized process collection.

In a particular example, the metrics for VPC 1 312 collected by VPC Agent 310 reflect enough information for VPC Manager 302 to analyze and make key decisions about when and to what partition the virtualized process collection should be migrated. VPC Agent 310 then stores the collected metrics and provides the metrics to VPC Manager 302. VPC Manager 302 communicates with VPC Agent 310 through a coordinator of VPC Agent-specific events, or VPC Agent Event Coordinator (AEC) 318. Likewise, VPC Manager 302 communicates with VPC Agent 311 through VPC Agent Event Coordinator (AEC) 319. An Event Coordinator is a multi-threaded process which manages the life-cycle of its own threads to achieve a high fidelity of cross-system communication with VPC Agents 310 and 311, respectively.

VPC Manager 302 is a multi-threaded process which monitors the metrics transmitted from VPC Agents 310 and 311. VPC Manager 302 comprises Utility Computing Engine (UCE) 320, Event Queue Manager 322, and Performance Monitor 324. Once metrics have been received from an agent such as VPC Agent 310, these metrics are analyzed by Utility Computing Engine 320. Utility Computing Engine 320 employs dynamic, policy driven algorithms based on system events to drive the decisions on when to migrate applications. Use of Utility Computing Engine 320 in the virtualized process space is unique due to the use of algorithms which have been heavily tested and are more feature rich than other management software approaches. These algorithms are specifically designed for Utility Computing.

Utility Computing Engine 320 signals VPC Manager 302 using a database event queuing system, Event Queue Manager (EQM) 322. Event Queue Manager (EQM) 322 is responsible for propagating events throughout VPC Manager 302.

Performance Monitor (PM) 324 collects the performance metrics from VPC Agent 310 and persists the metrics to database 330. Performance Monitor 324 is also responsible for validating the authenticity of the VPC Agent to decide if Performance Monitor 324 is allowed to receive performance metrics from that VPC Agent.

Performance Monitor (PM) 324 also analyzes the performance metrics using the generic algorithm which allows for ranking resources by prioritized policy for workload migration. Performance Monitor (PM) 324 checks for trigger violations in the new performance metric updates. A trigger violation occurs when a performance metric value exceeds a configured high or low threshold specified in a policy. Within Performance Monitor (PM) 324, the trigger is an algorithmic comparison of a performance metric value to the configured thresholds in the policy. When a threshold is exceeded, Performance Monitor (PM) 324 regards this as a trigger violation and signals Utility Computing Engine 320 to execute stack tier analysis using Stack Tier Analyzer 326. A stack is an application stack, or a group of applications (virtualized process collections) that logically work together. A tier is a level on the stack that describes a specific application (virtualized process collection) component of the stack. For instance, a high level grouping of related virtualized process collections may be defined in the system as a "tier" of virtualized process collections. Execution of a stack tier analysis by Stack Tier Analyzer 326 may result in a migration event based on the performance state of all virtualized process collections associated to the tier. The migration event may be created from the stack tier analysis by a request for event creation from Event Queue Manager 322. The generic algorithm for analyzing collected performance metrics is described further in FIGS. 9A and 9B.

When Utility Computing Engine 320 receives the migration event from Event Queue Manager 322, Utility Computing Engine 320 reviews the configured policy for the stack tier to decide what migration action should be taken. The resulting action is a migration event once Utility Computing Engine 320 determines the best location or target partition to send the virtualized process collection. To determine the best migration target partition, Target Ranker 328 in Utility Computing Engine 320 is used to compile a list of the target partitions in the system and rank the server partitions based on current workload partition performance state. The process for VPC migration event targeting is described further in FIGS. 10 and 11.

Utility Computing Engine 320 then provides the migration event created through Event Queue Manager 322 to Event Coordinator 318. Event Coordinator 318 opens a connection over TCP (Transmission Control Protocol) using SOAP (Simple Object Access Protocol) to request VPC Agent 310 take action on the migration event. VPC Agent 310 migrates the virtualized process collection to another VPC Agent (not shown), the target of the migration, as specified by Utility Computing Engine 320 when the migration event was created.

The VPC Agent target communicates with its own Event Coordinator to verify compatibility traits of the source and target partitions. The VPC Manager then conducts the migration in coordination with the source and target VPC Agents 310 and its Event Coordinator 318.

When the migration or the virtualized process collection has completed successfully, Event Coordinator 318 notifies Event Queue Manager 322, so that the migration event may be marked as "completed".

Figure 4:
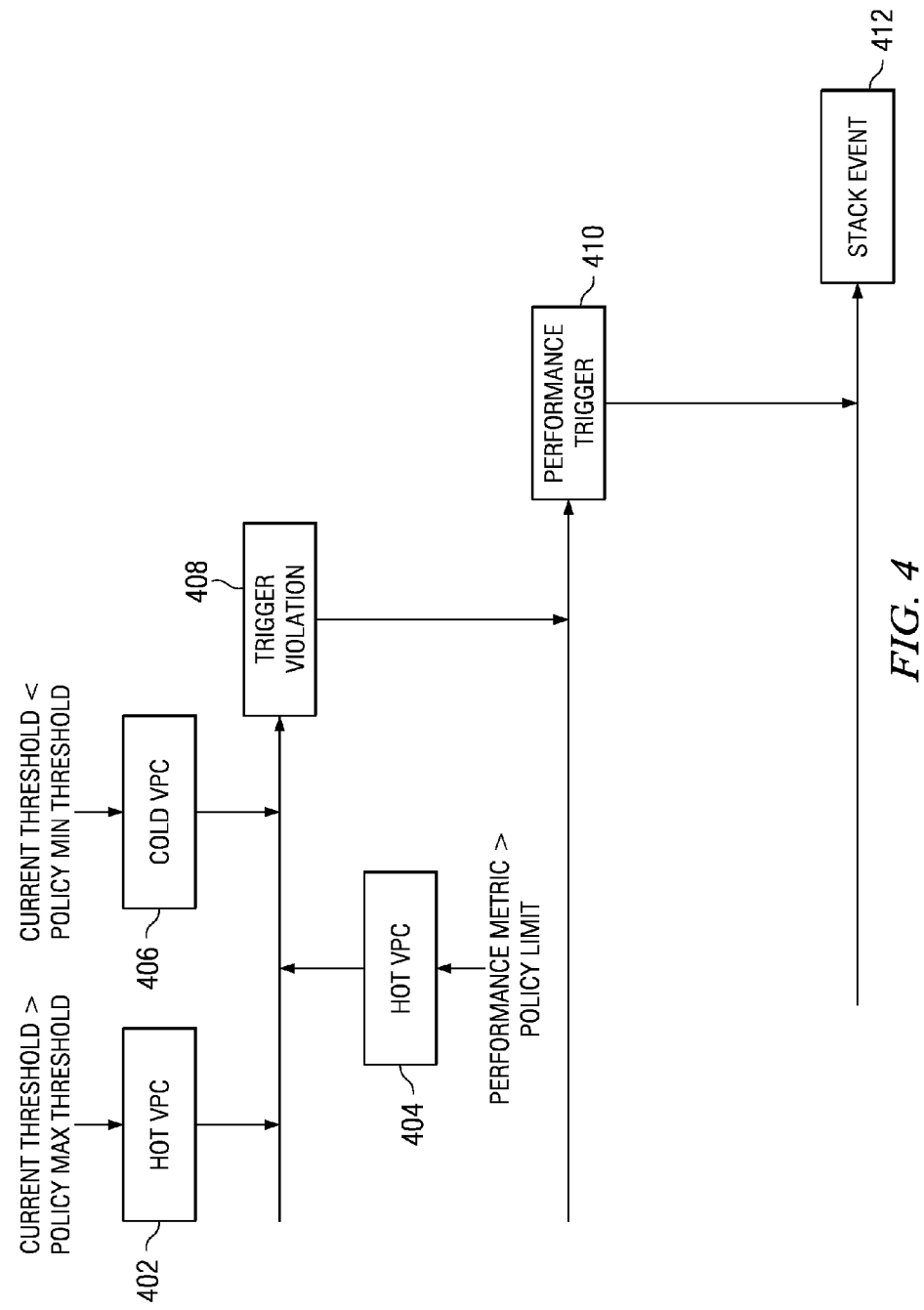
FIG. 4 is a diagram illustrating an overview of a stack tier analysis which may result in a migration event in accordance with the illustrative embodiments.

FIG. 4 is a diagram illustrating an overview of a stack tier analysis which may result in a migration event in accordance with the illustrative embodiments. As previously mentioned, a VPC Agent, such as VPC Agents 310 and 311 in FIG. 3, gathers performance metrics for virtualized process collections. These performance metrics are then provided to Performance Monitor 324 in VPC Manager 302 in FIG. 3. In response to receiving performance metrics for a collection, Performance Monitor 324 determines if a stack tier identifies trigger violations in the received metrics. A trigger violation occurs when Performance Monitor 324 determines that performance metric values collected from the VPC Agents, such as VPC Agents 310 and 311 in FIG. 3 exceed a configured high or low threshold specified in the policy for the tier. For example, "hot" VPC 402 is a virtualized process collection in which the current threshold of the performance metrics is above a maximum threshold value of the tier policy. "Hot" VPC 404 may also be a virtualized process collection whose current threshold of performance metrics exceeds a tier policy maximum limit. "Cold" VPC 406 is a virtualized process collection in which the current threshold of the performance metrics is below a minimum threshold value of the tier policy. When enough virtualized process collection instances associated with the same tier are in violation of tier policy thresholds, the Performance Monitor regards this as trigger violation 408. Trigger violation 408 generates performance trigger 410, which may comprise a signal that is provided from Performance Monitor 324 to the Utility Computing Engine 320 in FIG. 3 to generate stack event 412. The stack event is the execution of the stack tier analysis by Stack Tier Analyzer 326 in Utility Computing Engine 320 in FIG. 3. Execution of the stack tier analysis by Utility Computing Engine 320 in FIG. 3 may result in a migration event based on the performance state of all virtualized process collections associated to the tier. The migration event may move a virtualized process collection to a more powerful server or a dedicated server based on the stack tier analysis.

Figure 5:
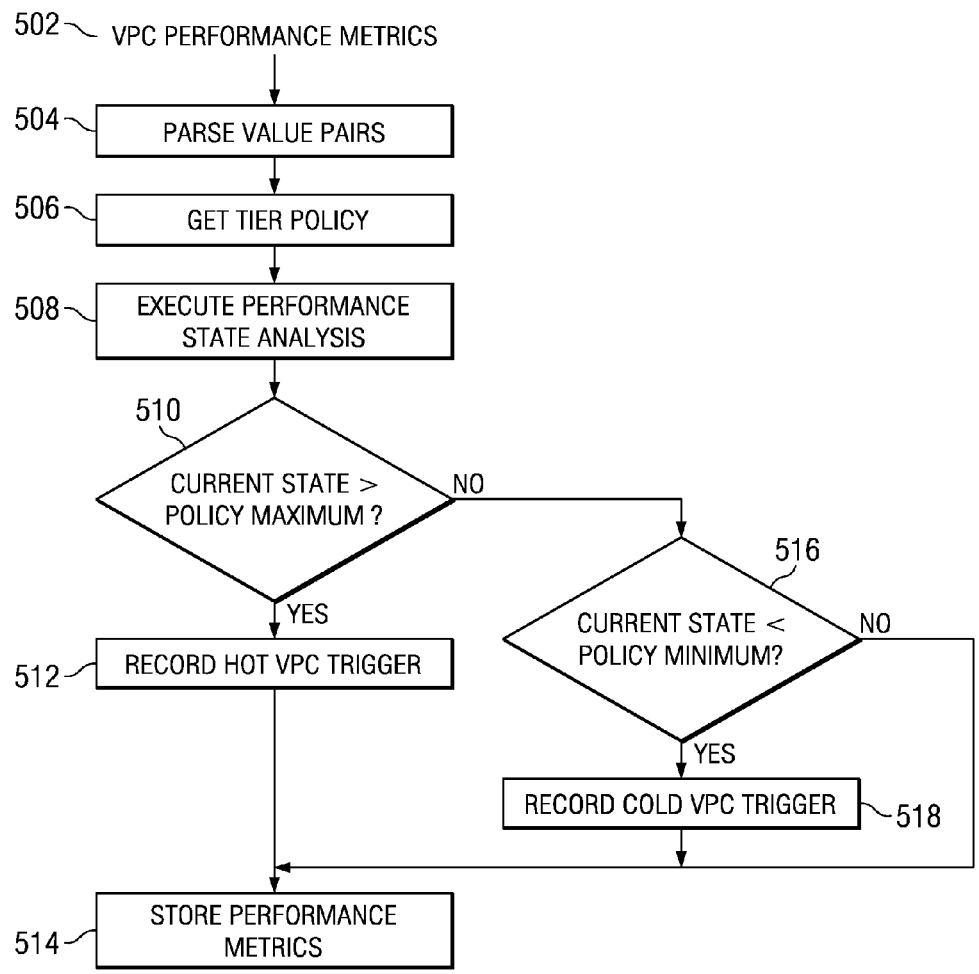
FIG. 5 is a flowchart illustrating a process for aggregating virtualized process collection performance data for determining virtualized process collection triggers in accordance with the illustrative embodiments.

FIG. 5 is a flowchart illustrating a process for aggregating virtualized process collection performance data for determining virtualized process collection triggers in accordance with the illustrative embodiments. In particular, the process in FIG. 5 describes the virtualized process collection performance trigger aggregation in the stack tier analysis. The process may be performed by a performance monitor in the VPC Manager, such as Performance Monitor 324 in FIG. 3.

The process begins when the Performance Monitor obtains the performance metrics for a virtualized process collection from the VPC Agents (step 502). The Performance Monitor parses the value pairs in the metrics (step 504), and obtains the policy for the stack tier (step 506). The policy comprises the metric threshold values calculated by the generic algorithm for the stack tier. The Performance Monitor then executes a performance state analysis (step 508).

The performance state analysis uses the policy to determine if there are any trigger (threshold) violations in the collected performance metrics. In the analysis, the Performance Monitor determines whether the current state or threshold level of the collected performance metrics is higher than a maximum threshold value in the policy (step 510). If the current state or threshold level of the collected performance metrics is higher than the maximum threshold value in the policy ('yes' output of step 510), the Performance Monitor records the virtualized process collection metrics as being a "hot" virtualized process collection trigger (step 512). A hot virtualized process collection trigger includes metrics whose performance thresholds are higher than the maximum threshold specified in the policy for that virtualized process collection. In this case, the hot virtualized process collection will need to be migrated to another server partition. The Performance Monitor then stores the performance metrics in a database, such as database 330 in FIG. 3 (step 514).

Turning back to step 510, if the current state or threshold level of the collected performance metrics is not higher than the maximum threshold value in the policy ('no' output of step 510), the Performance Monitor determines whether the current state or threshold level of the metrics is lower than the minimum threshold value in the policy (step 516). If the current state or threshold level of the collected performance metrics is not lower than the minimum threshold value in the policy ('no' output of step 516), no trigger is recorded and the Performance Monitor stores the performance metrics in a database (step 514).

Turning back to step 516, if the current state or threshold level of the virtualized process collection metrics is lower than the minimum threshold value in the policy ('yes' output of step 516), the Performance Monitor records the metrics as being a "cold" virtualized process collection trigger (step 518). A cold virtualized process collection trigger includes metrics whose performance thresholds are lower than the minimum threshold specified in the policy for that virtualized process collection. In this case, the cold virtualized process collection will need to be migrated to another server partition. The Performance Monitor then stores the performance metrics in a database (step 514).

Figure 6:
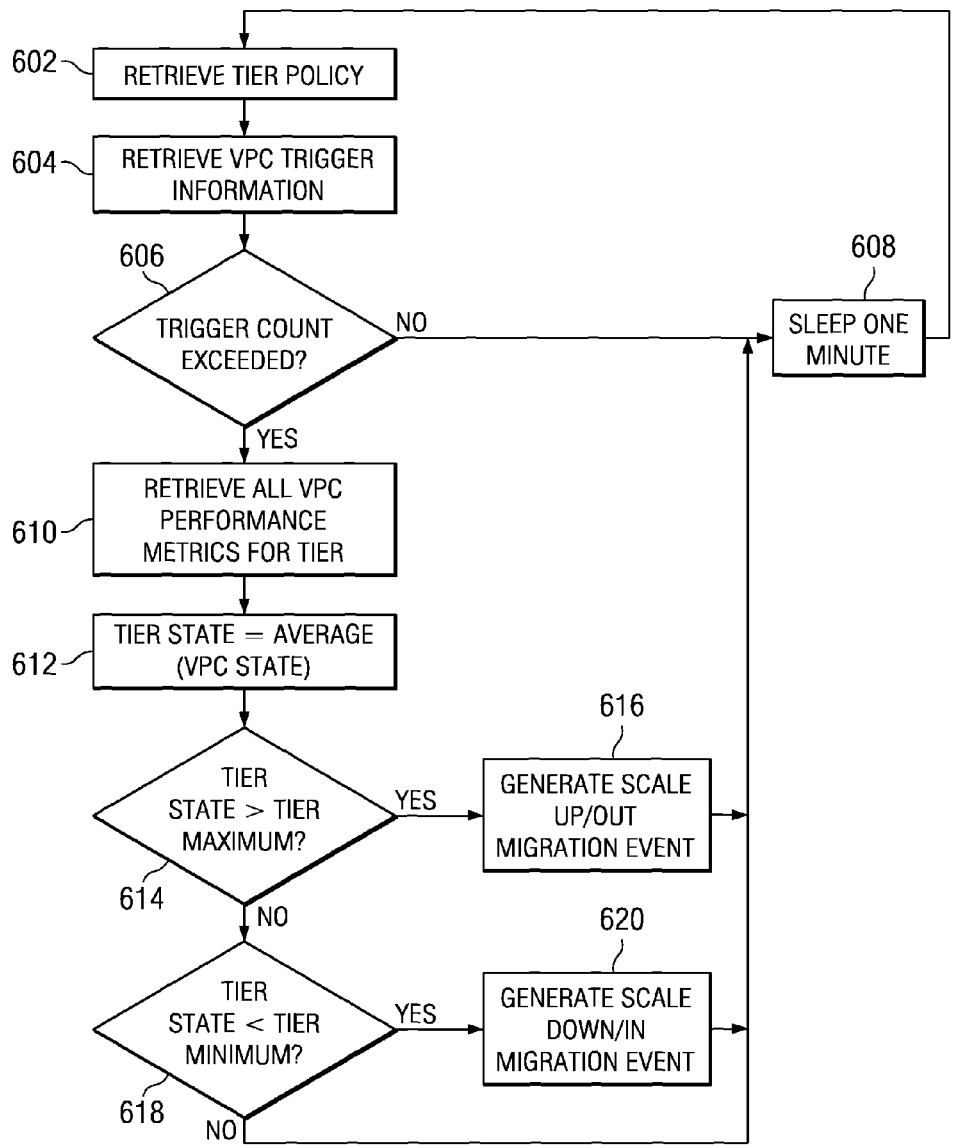
FIG. 6 is a flowchart illustrating a process for the stack tier analysis in accordance with the illustrative embodiments.

FIG. 6 is a flowchart illustrating a process for the stack tier analysis in accordance with the illustrative embodiments. The stack tier analysis in FIG. 6 may be performed by Utility Computing Engine 320 in FIG. 3. The process describes how the Utility Computing Engine reviews the configured policy for the stack tier to determine what migration action should be taken for the virtualized process collection. The process is initiated when the Utility Computing Engine receives a signal from the Performance Monitor to execute the state tier analysis based on the performance state analysis in FIG. 6.

Responsive to receiving the signal from the Performance Monitor, the Utility Computing Engine retrieves the policy for the stack tier (step 602). The Utility Computing Engine also retrieves the virtualized process collection trigger information (step 604). The virtualized process collection trigger information may be obtained from database 330 in FIG. 3 (trigger information was recorded in steps 512 and 518 in FIG. 5). The Utility Computing Engine then determines whether a trigger violation count has been exceeded (step 606). A trigger violation count is a value which indicates how many times a trigger violation has occurred. If the number of trigger violations that have occurred does not exceed the trigger violation count ('no' output of step 606), the Utility Computing Engine sleeps for a defined time period (e.g., one minute) (step 608), and the process loops back to step 602. If the number of trigger violations that have occurred exceeds the trigger count ('yes' output of step 606), the Utility Computing Engine retrieves all performance metrics for the stack tier (step 610). These performance metrics for the stack tier may be obtained from the Performance Monitor.

Next, the Utility Computing Engine calculates the performance state of the stack tier by averaging the states of the virtualized process collection (step 612). The Utility Computing Engine then determines whether the calculated tier state is higher than the maximum tier state specified in the tier policy (step 614). If the calculated tier state is higher than the maximum tier state specified in the tier policy ('yes' output of step 614), the Utility Computing Engine generates a scale up or scale out migration event (step 616). The Utility Computing Engine generates the event by requesting migration event creation from Event Queue Manager 322 in FIG. 3. A 'scale up' event migrates the virtualized process collection to a more powerful server. A 'scale out' event migrates the virtualized process collection to a dedicated server. The Utility Computing Engine then sleeps for a defined time period (e.g., one minute) (step 608), and the process loops back to step 602.

Turning back to step 614, if the calculated tier state is not higher than the maximum tier state specified in the tier policy ('no' output of step 614), the Utility Computing Engine determines if the calculated tier state is lower than a minimum tier state specified in the tier policy (step 618). If the calculated tier state is lower than the minimum tier state specified in the tier policy ('yes' output of step 618), the Utility Computing Engine generates a scale down or scale in migration event (step 620). A 'scale down' event migrates the virtualized process collection to a less powerful server. A 'scale in' event consolidates the virtualized process collection to a single server. The Utility Computing Engine then sleeps for a defined time period (e.g., one minute) (step 608), and the process loops back to step 602.

Turning back to step 618, if the calculated tier state is not lower than the minimum tier state specified in the tier policy ('no' output of step 618), the Utility Computing Engine sleeps for a defined time period (e.g., one minute) (step 608), and the process loops back to step 602.

FIG. 7 is a flowchart illustrating a process for virtualized process collection migration in accordance with the illustrative embodiments. The virtualized process collection migration process described in FIG. 7 occurs when the Utility Computing Engine determines, based on the stack tier analysis, that the virtualized process collection should be relocated.

The process begins with a checkpoint command being sent to a checkpoint agent on the source logical partition containing the virtualized process collection (step 702). A determination is made by the Event Coordinator as to whether the virtualized process collection is paused from the checkpoint operation (step 704). If the virtualized process collection is paused ('yes' output of step 704), the Event Coordinator executes the virtualized process collection configuration scripts on the target logical partition (step 706). The virtualized process collection is then restarted on the target logical partition (step 708).

The Event Coordinator then determines if the virtualized process collection is running on the target logical partition (step 710). If the virtualized process collection is not running ('no' output of step 710), the Event Coordinator initiates a migration failure recovery (step 712).

Turning back to step 704, if the virtualized process collection is not paused ('no' output of step 704), the Event Coordinator initiates a migration failure recovery (step 712).

Turning back to step 710, if the virtualized process collection is running ('yes' output of step 710), the Event Coordinator verifies the health of the virtualized process collection (step 714). If the health of the virtualized process collection is not verified ('no' output of step 714), the Event Coordinator initiates a migration failure recovery (step 712). If the health of the virtualized process collection is verified ('yes' output of step 714), the virtualized process collection on the source logical partition is destroyed (step 716). A determination is made as to whether the virtualized process collection on the source logical partition was destroyed (step 718). If the virtualized process collection was destroyed ('yes' output of step 718), the migration event is determined to be complete (step 720). If the virtualized process collection was not destroyed ('no' output of step 718), the Event Coordinator initiates a migration failure recovery (step 712).

Figure 8A:
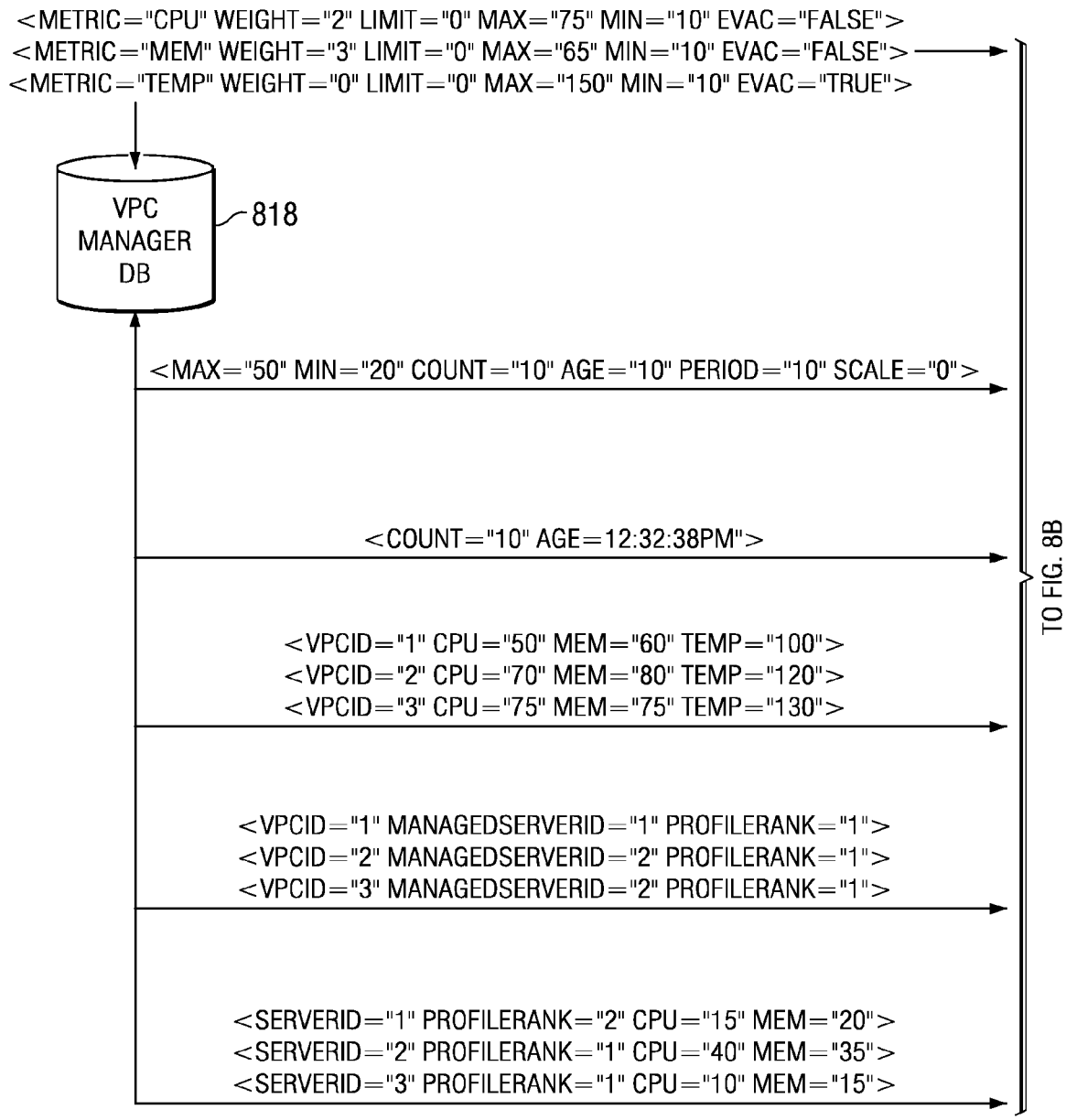
FIGS. 8A and 8B are a system overview of virtualized process collection management in accordance with the illustrative embodiments.
Figure 8B:
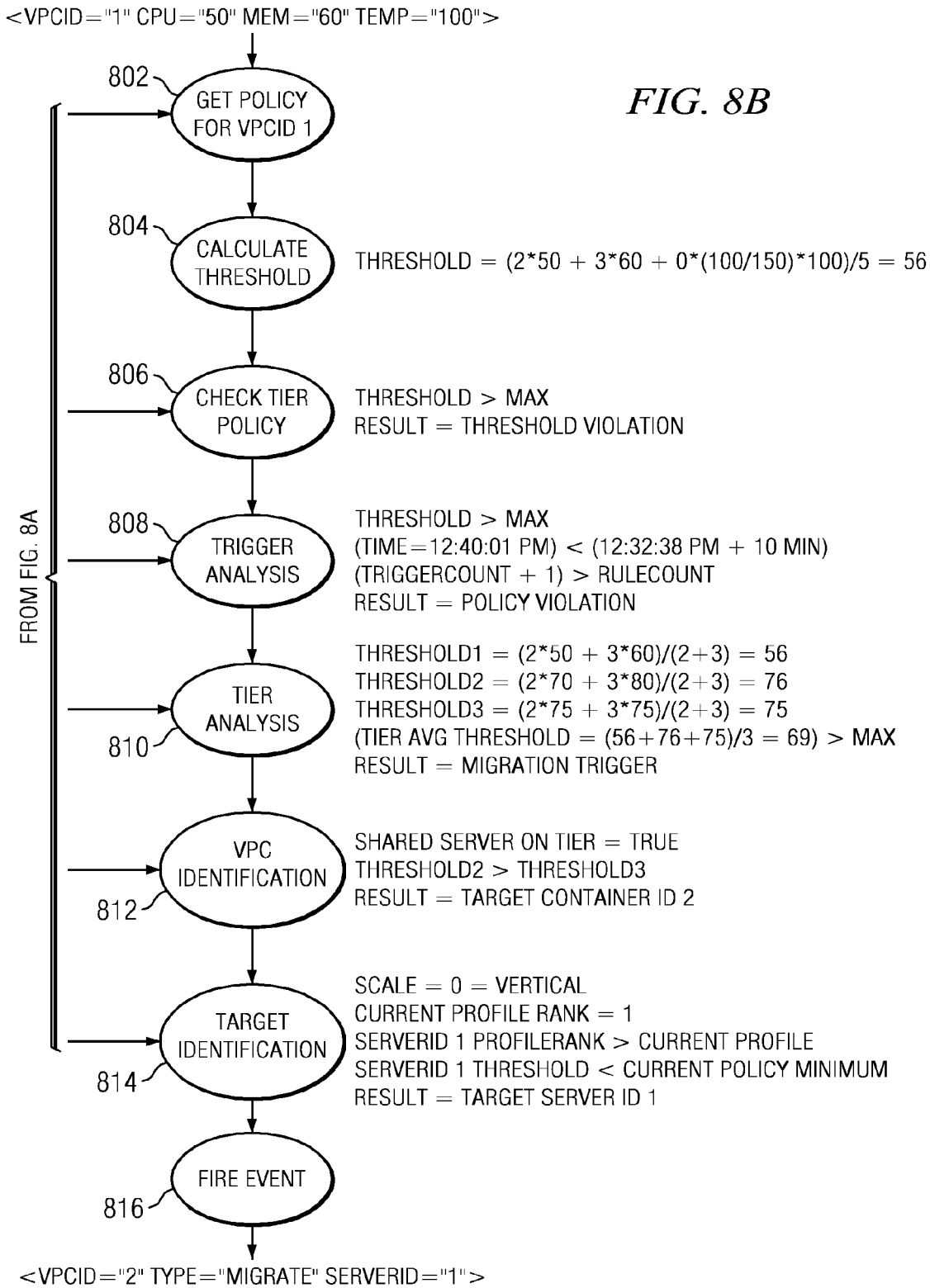

FIGS. 8A and 8B are a system overview of virtualized process collection management in accordance with the illustrative embodiments. The Stack Tier Analyzer obtains the policy for a virtualized process collection (VPCID 1) in step 802. The Stack Tier Analyzer calculates the threshold for a collected set of metrics for the tier in step 804. A threshold calculation may be performed when performance metrics are received on a per virtualized process collection basis, as well as during a stack tier analysis when a trigger count violation is detected. The Performance Monitor then performs the performance state analysis by comparing the tier policy against the calculated thresholds in the tier policy to identify any trigger violations in step 806. The Utility Computing Engine executes a trigger analysis which determines if the number of identified trigger violations exceeds a trigger count in step 808.

Using the calculated thresholds, the Utility Computing Engine performs a stack tier analysis which determines whether the average of the tier thresholds exceeds a maximum threshold specified in the tier policy in step 810. If the maximum or minimum threshold is violated, a migration event is generated.

The Target Ranker then identifies each virtualized process collection based on the individual threshold levels and determines the type of server partition to which each virtualized process collection should be migrated in step 812. The Target Ranker also identifies the best target server partition that each virtualized process collection should be migrated in step 814. The VPC Manager then fires the migration event in step 816. VPC Manager database 818 may provide the information for each step as needed.

Figure 9A:
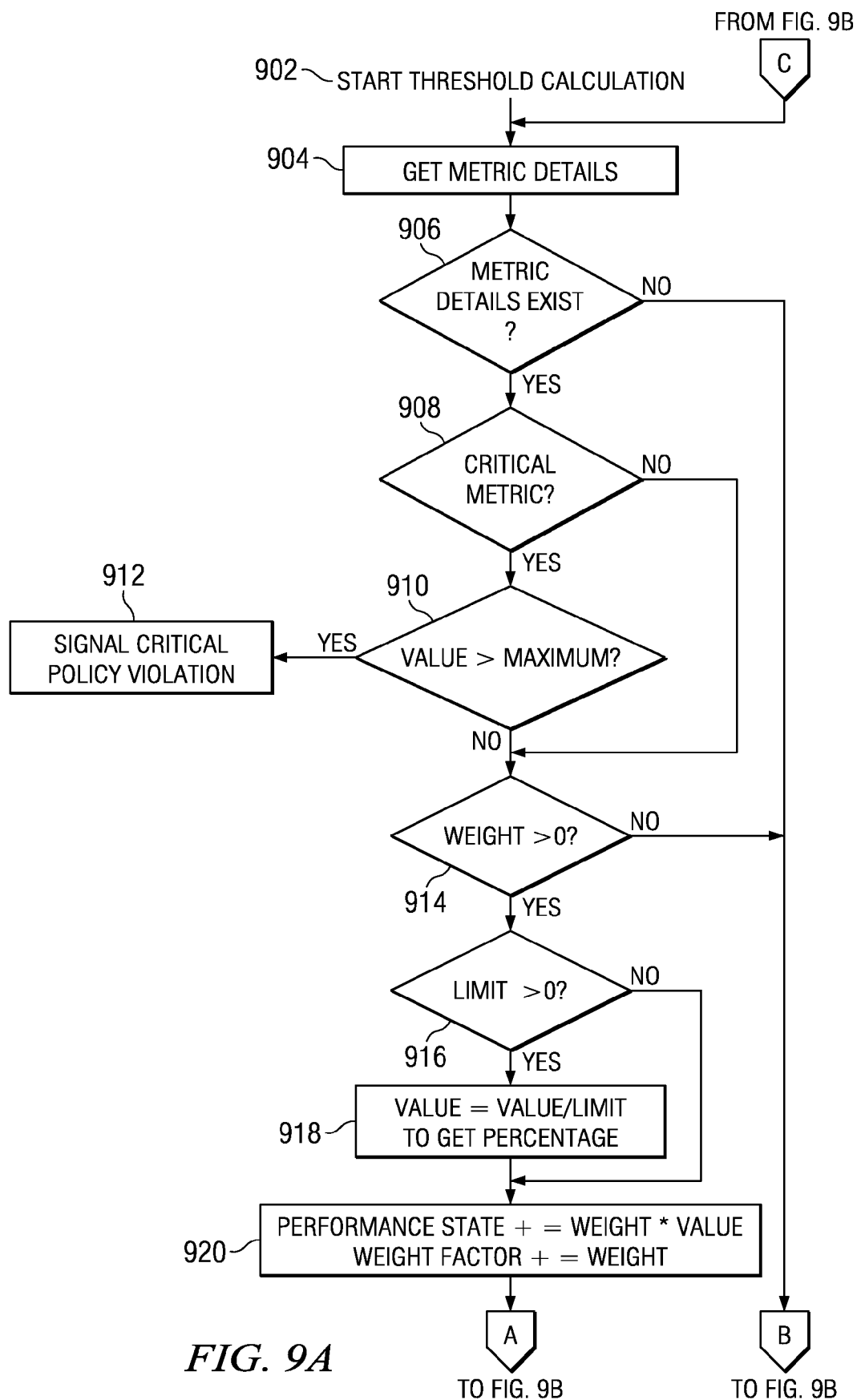
FIGS. 9A and 9B are a flowchart illustrating a generic algorithm for correlation of related metrics in accordance with the illustrative embodiments.
Figure 9B:
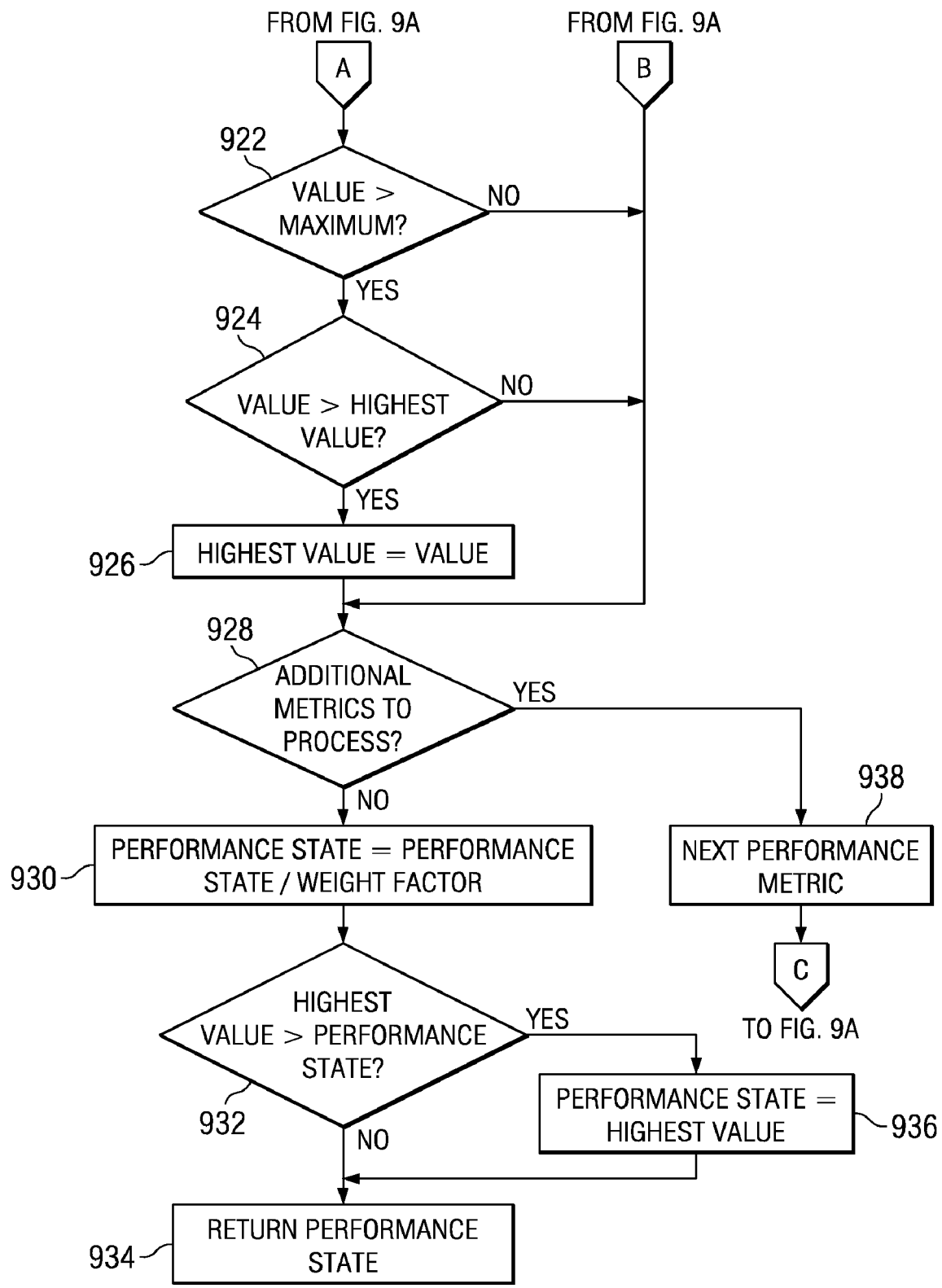

FIGS. 9A and 9B are a flowchart illustrating a generic algorithm for correlation of related metrics in accordance with the illustrative embodiments. The generic algorithm in FIGS. 9A and 9B may be used by a correlation engine which is referenced by the performance monitor and the stack tier analyzer to execute the performance state analysis in step 508 in FIG. 5.

The process begins by starting a threshold calculation for a tier policy (step 902). The correlation engine then obtains details about each metric in a virtualized process collection (step 904). A determination is made by the correlation engine as to whether metric details exist for the metrics (step 906). If metric details do not exist ('no' output of step 906), the process continues to step 928. If metric details exist ('yes' output of step 906), the correlation engine determines if a metric in the collection is a critical metric (step 908). A critical metric has a boolean property indicating that the metric indicates a critical monitor value. If the metric is not a critical metric ('no' output of step 908), the correlation engine continues to step 914. If the metric is a critical metric ('yes' output of step 908), the correlation engine determines if the value of the metric is higher than the maximum property specified in the tier policy (step 910). A maximum property is a float describing the policy trigger value for the metric. If the metric value is higher than the maximum value (threshold trigger value) in the policy ('yes' output of step 910), the correlation engine sends a critical policy violation signal to the VPC Manager (step 912). If the metric value is not greater than the maximum value specified in the policy ('no' output of step 910), the correlation engine continues to step 914.

At step 914, the correlation engine determines whether the weight property of the metric is higher than 0 (step 914). The weight property is a float indicating the relative weight to be assigned for the particular metric. The correlation engine keeps a running total of the weight properties which is referred to as the weight factor. The weight factor is the total of all weight properties. If the weight property of the metric is not higher than 0 ('no' output of step 914), the process continues to step 928. If the weight property of the metric is higher than 0 ('yes' output of step 914), the correlation engine determines whether the limit property of the metric is higher than 0 (step 916). The limit property is a float describing the highest expected value allowed for the metric. If the limit property of the metric is higher than 0 ('yes' output of step 916), the correlation engine first calculates the percentage value of the metric as the metric value divided by the limit property of the metric (step 918), and then continues to step 920. If the limit property of the metric is not higher than 0 ('no' output of step 916), the correlation engine calculates the performance state of the metric as the weight property of the metric divided by the weight factor total to determine the weighted average of all metrics (step 920).

Once the performance state of the metric has been calculated, the correlation engine determines if the value of the metric is higher than the maximum property specified in the tier policy (step 922). If the metric value is not higher than the maximum value ('no' output of step 922), the process continues to step 928. If the metric value is higher than the maximum value ('yes' output of step 922), the correlation engine determines if the value of the metric is the highest value (maximum value) for all metrics processed (step 924). If the metric value is the maximum value ('yes' output of step 924), the correlation engine stores that metric value as the highest value which has violated a metric maximum property for all recorded metrics (step 926), and the process continues to step 928. If the value is not the maximum value ('no' output of step 924), the correlation engine continues to step 928.

At step 928, the correlation engine determines if there are additional metrics in the collection to process (step 928). If there are additional metrics in the collection to process ('yes' output of step 928), the process continues to step 938 to process the next metric, and process continues to step 904. If there are no additional metrics in the collection to process ('no' output of step 928), the correlation engine calculates the performance state of the metric by dividing the total weighted performance state calculated in step 920 by the total weight for all metrics (step 930).

The correlation engine then makes a determination as to whether the highest value calculated in step 926 and recorded as violating a metric maximum is higher than the weighted average performance state of all metrics calculated in step 930 (step 932). If the highest value is not higher than the performance state of the metric ('no' output of step 932), the correlation engine returns the performance state of the metric to the component that requested the state analysis (e.g., the Performance Monitor or Stack Tier Analyzer) (step 934). If the highest value exceeds the weighted average performance state of all metrics ('yes' output of step 932), the correlation engine first uses the highest value as the performance state of that virtualized process collection (step 936) before returning the new performance state to the component that requested the state analysis (e.g., the Performance Monitor or Stack Tier Analyzer) (step 934).

Other implementations of the generic algorithm in FIGS. 9A and 9B may include ranking, rating, and targeting systems related to establishing compliance with complex business criteria. Survey data related to products, services, and business processes may be correlated into a single measurement of overall effectiveness or health of a customer account or the financial performance of a business unit or product. By identifying and weighting individual metrics and data trends as interesting from a business perspective, a ranking policy may be created and driven by the algorithm to elevate certain accounts, products, or services for review.

Figure 10A:
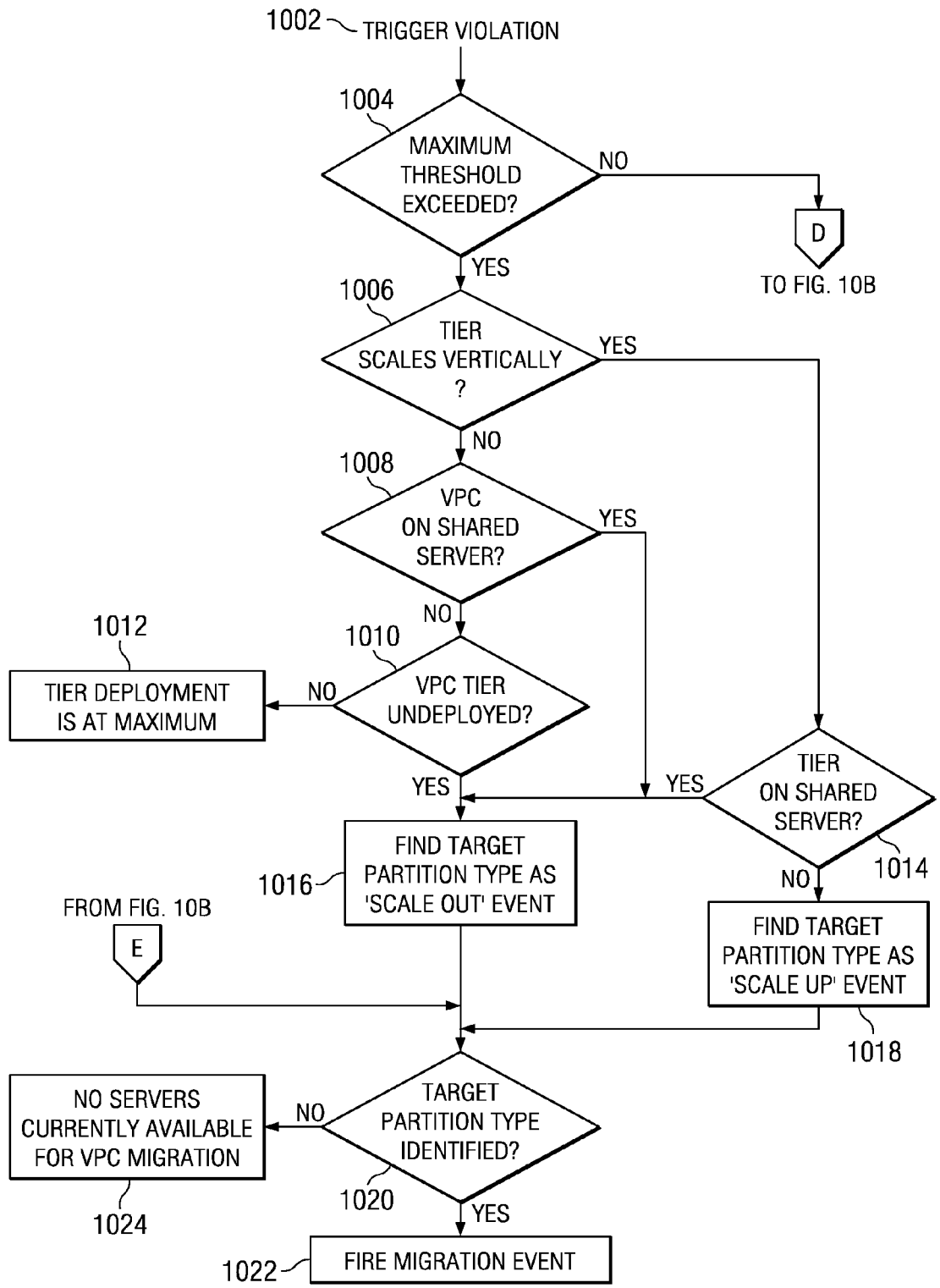
FIGS. 10A and 10B are a flowchart illustrating a process for determining the type of target partition for migration based on the performance state of the virtualized process collection in accordance with the illustrative embodiments.
Figure 10B:
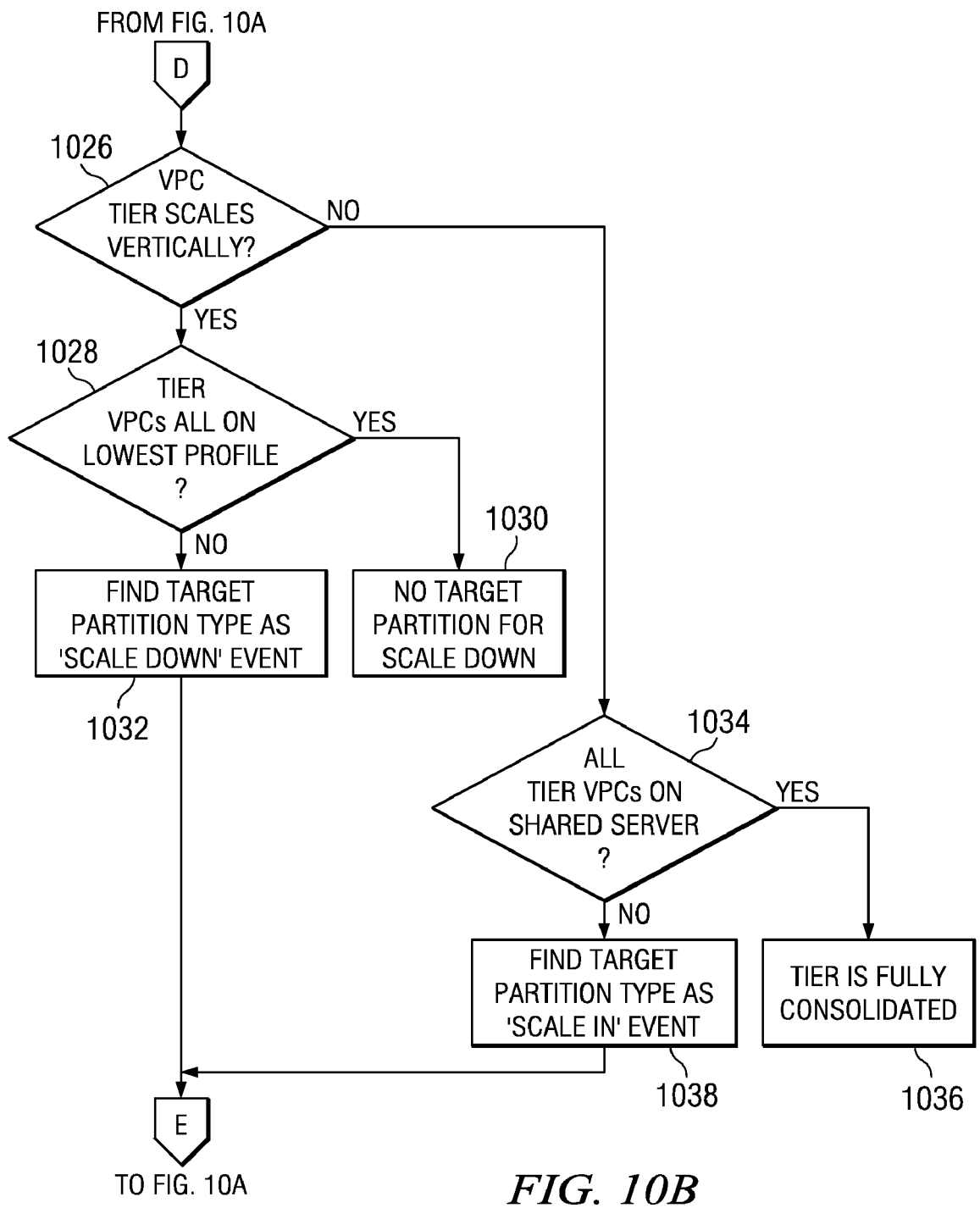

FIGS. 10A and 10B are a flowchart illustrating a process for determining the type of target partition for migration based on the performance state of the virtualized process collection in accordance with the illustrative embodiments. The process in FIGS. 10A and 10B may be used by the Utility Computing Engine in the VPC Manager to determine to which type of server partition a virtualized process collection algorithm may be migrated. In particular, the Utility Computing Engine may use the process in FIGS. 10A and 10B to generate the scale up/out migration event and scale down/in migration events in steps 616 and 620 in FIG. 6.

The process begins when a trigger violation is received at the Target Ranker (step 1002). A trigger violation occurs when a performance state value for the virtualized process collection exceeds a configured high or low threshold specified in a policy. The Target Ranker determines whether the violation is due to the maximum threshold specified in the policy being exceeded (step 1004). If the maximum threshold has been exceeded ('yes' output of step 1004), the Target Ranker determines if the tier comprising the virtualized process collection scales vertically (step 1006).

The term "scalability" defines how server partitions are selected for a specific virtualized process collection when the average performance state of all virtualized process collection on a given tier falls above or below the specified maximum and minimum thresholds in the tier policy. Vertical scalability implies that a virtualized process collection needs to relocate to a dedicated or more powerful server partition when the metrics for the virtualized process collection exceed a maximum threshold defined in a tier policy, or either consolidate to a shared server or relocate to a less powerful server when the virtualized process collection falls below a minimum threshold. Horizontal scalability implies that the virtualized process collection needs to relocate to a dedicated server partition when the metrics for the virtualized process collection exceed a maximum threshold defined in a tier policy, or consolidate to a shared partition when the virtualized process collection exceeds a minimum threshold.

If the virtualized process collection tier scales vertically ('yes' output of step 1006), the Target Ranker determines if the virtualized process collection tier is located on a shared server (step 1014). If the virtualized process collection tier is located on a shared server ('yes' output of step 1014), the Target Ranker identifies the target partition type as a "scale out" migration event (step 1016), and the process continues to step 1020. If the virtualized process collection tier is not located on a shared server ('no' output of step 1014), the Target Ranker identifies the target partition type as a "scale up" migration event (step 1018), and the process continues to step 1020.

Turning back to step 1006, if the virtualized process collection tier does not scale vertically ('no' output of step 1006), the Target Ranker determines if the virtualized process collection tier is located on a shared server (step 1008). If the virtualized process collection tier is located on a shared server ('yes' output of step 1008), the process continues to step 1016.

If the virtualized process collection tier is not located on a shared server ('no' output of step 1008), the Target Ranker determines if the virtualized process collection tier is undeployed (step 1010). If the virtualized process collection tier is not undeployed ('no' output of step 1010), the Target Ranker determines that the tier deployment is at a maximum (step 1012). If the virtualized process collection tier is undeployed ('yes' output of step 1010), the process continues to step 1016.

At step 1020, the Target Ranker determines if a target partition type has been identified (step 1020). If a target partition type has been identified ('yes' output of step 1020), a migration event is fired by the Utility Computing Engine (step 1022). If no target partition type is identified ('no' output of step 1020), no servers are currently available for virtualized process collection migration (step 1024).

Turning back to step 1004, if the maximum threshold has not been exceeded ('no' output of step 1004), the Target Ranker determines if the tier comprising the virtualized process collection scales vertically (step 1026). If the tier scales vertically ('yes' output of step 1026), the Target Ranker determines if all of the virtualized process collections in the tier are on the lowest level of the vertical scale (step 1028). If the virtualized process collections are all on the lowest profile ('yes' output of step 1028), the Target Ranker determines that there is no target partition for a "scale down" migration event (step 1030).

Turning back to step 1028, if the virtualized process collections are not all on the lowest profile ('no' output of step 1028), the Target Ranker identifies a target partition for a "scale down" migration event (step 1032). The process then continues to step 1020.

Turning back to step 1026, if the virtualized process collection tier does not scale vertically ('no' output of step 1026), the Target Ranker determines if all of the virtualized process collection in the tier are located on a shared server (step 1034). If all of the virtualized process collections are on a shared server ('yes' output of step 1034), the Target Ranker determines that the virtualized process collection tier is fully consolidated (step 1036). If all of the virtualized process collections are not on a shared server ('no' output of step 1034), the Target Ranker identifies a target partition for a "scale in" migration event (step 1038), and the process continues to step 1020.

Figure 11:
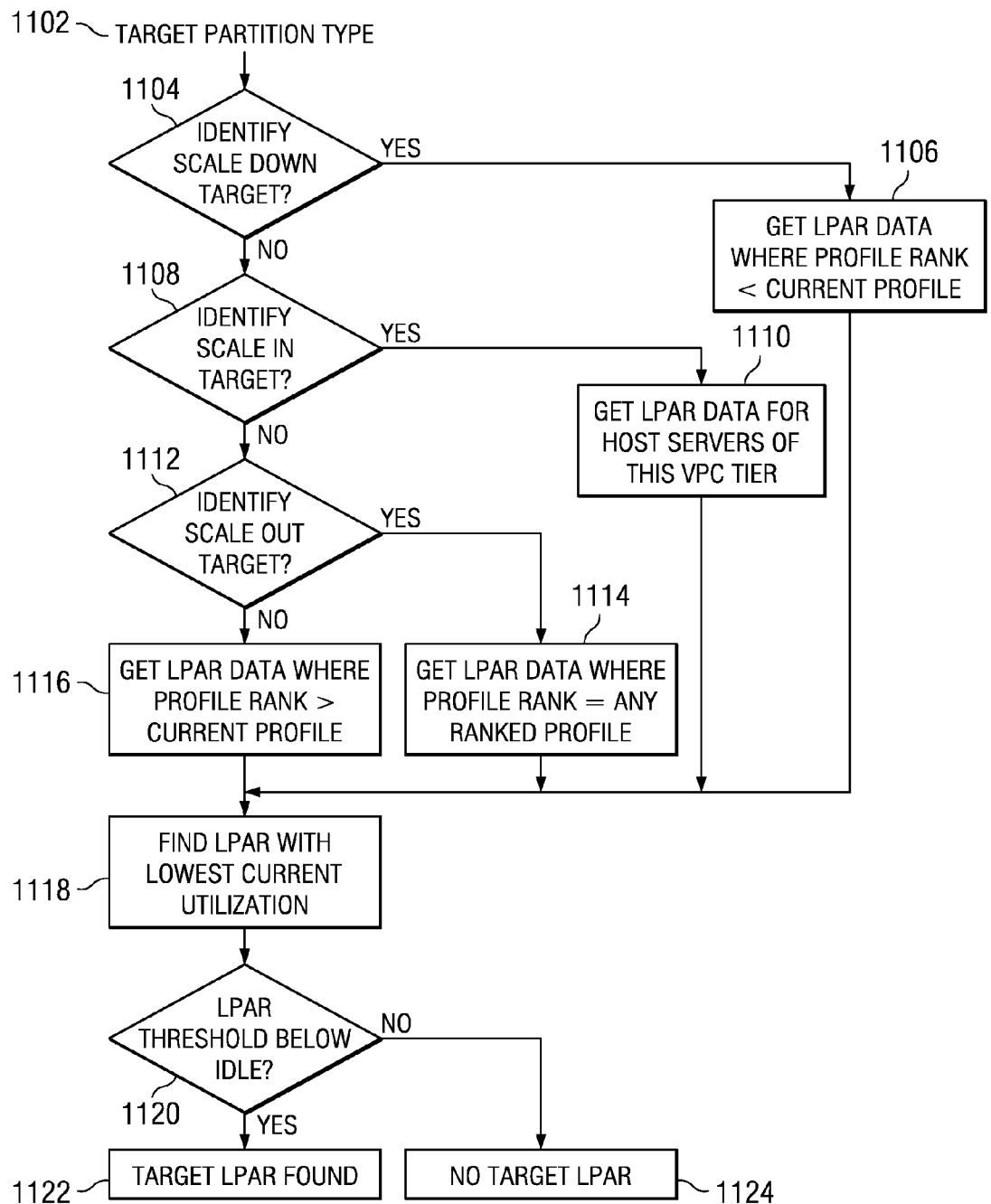
FIG. 11 is a flowchart illustrating a process for selecting a target partition based on the partition type identified in FIGS. 10A and 10B in accordance with the illustrative embodiments.

FIG. 11 is a flowchart illustrating a process for selecting a target partition based on the partition type identified in FIGS. 10A and 10B in accordance with the illustrative embodiments. In particular, the process in FIG. 11 uses the target server type determination made in FIGS. 10A and 10B to select a particular target server partition from the identified server type which to migrate a virtualized process collection.

The process determines if the target server type identified in FIGS. 10A and 10B (step 1102) is a "scale down" target (step 1104). If the target server type is a "scale down" target ('yes' output of step 1104), the Target Ranker obtains logical partition (LPAR) data where the partition profile rank of a WPAR is lower than the current WPAR profile rank (step 1106). The process then continues to step 1118.

Turning back to step 1104, if the target server type is not a "scale down" target ('no' output of step 1104), the Target Ranker determines if the target server type is a "scale in" target (step 1108). If the target server type is a "scale in" target ('yes' output of step 1108), the Target Ranker obtains LPAR data for host servers of this tier (step 1110). The process then continues to step 1118.

Turning back to step 1108, if the target server type is not a "scale in" target ('no' output of step 1108), the Target Ranker determines if the target server type is a "scale out" target (step 1112). If the target server type is a "scale out" target ('yes' output of step 1112), the Target Ranker obtains LPAR data where the partition profile rank is any ranked WPAR (step 1114). The process then continues to step 1118.

Turning back to step 1112, if the target server type is not a "scale out" target ('no' output of step 1112), the Target Ranker find a "scale up" target by obtaining LPAR data where the partition profile rank is higher than the current WPAR profile rank (step 1116). The process then continues to step 1118.

At step 1118, the Target Ranker finds the LPAR with the lowest current resource utilization (step 1118). The Target Ranker then determines if the located LPAR threshold is below "idle" (step 1120). If the LPAR threshold is below "idle" ('yes' output of step 1120), the particular target LPAR for the migration event is found (step 1122). If the LPAR threshold is not below "idle" ('no' output of step 1120), no target LPAR is found for the migration event (step 1124).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for analyzing performance metrics for a virtualized process collection, the computer implemented method comprising:
    determining, by a processing unit in a computer, a performance state value of a metric in a virtualized process collection using information in a stack tier policy, wherein the stack tier policy specifies at least a weight property, a limit property, a maximum property, and a minimum property for the metric, and wherein the weight property is multiplied by a collected value of the metric to calculate a weight adjusted metric value;
    responsive to determining that the value of the metric exceeds the maximum property specified in the stack tier policy, determining that a value of the metric is higher than values for all recorded metrics and storing the value of the metric as a highest value;
    responsive to calculating a weight adjusted metric value for a plurality of metrics in the virtualized process collection, determining an average performance state value of the plurality of metrics in the virtualized process collection by calculating a weight adjusted total of all weight adjusted metric values divided by a weight property total; and
    responsive to determining that the highest value is higher than the average performance state value of the plurality of metrics in the virtualized process collection, using the highest value as a performance state of the virtualized process collection.

2. The computer implemented method of claim 1, wherein the performance state values of metrics in the virtualized process collection comprise common property values comprising metadata describing the metrics.

3. The computer implemented method of claim 2, wherein the metadata includes a weight property, limit property, critical property, minimum property, and maximum property for each metric.

4. The computer implemented method of claim 2, wherein metadata is represented as a numeric rate or a percentage value representing a data point.

5. The computer implemented method of claim 1, wherein the critical metric has a boolean property indicating the metric has a critical monitor value.

6. A data processing system for analyzing performance metrics for a virtualized process collection, the data processing system comprising:
   a bus;
   a storage device connected to the bus, wherein the storage device contains computer usable code;
   at least one managed device connected to the bus;
   a communications unit connected to the bus; and
   a processing unit connected to the bus, wherein the processing unit executes the computer usable code to determine a performance state value of a metric in a virtualized process collection using information in a stack tier policy, wherein the stack tier policy specifies at least a weight property, a limit property, a maximum property, and a minimum property for the metric, and wherein the weight property is multiplied by a collected value of the metric to calculate a weight adjusted metric value; determine that a value of the metric is higher than values for all recorded metrics and storing the value of the metric as a highest value in response to determining that the value of the metric exceeds the maximum property specified in the stack tier policy; determine an average performance state value of the plurality of metrics in the virtualized process collection by calculating a weight adjusted total of all weight adjusted metric values divided by a weight property total in response to calculating a weight adjusted metric value for a plurality of metrics in the virtualized process collection; and use the highest value as a performance state of the virtualized process collection in response to determining that the highest value is higher than the average performance state value of the plurality of metrics in the virtualized process collection.

7. A computer program product for analyzing performance metrics for a virtualized process collection, the computer program product comprising:
   a non-transitory computer readable medium having computer usable program code tangibly embodied thereon, the computer usable program code comprising:
   computer usable program code for determining a performance state value of a metric in a virtualized process collection using information in a stack tier policy, wherein the stack tier policy specifies at least a weight property, a limit property, a maximum property, and a minimum property for the metric, and wherein the weight property is multiplied by a collected value of the metric to calculate a weight adjusted metric value;
   computer usable program code for determining that a value of the metric is higher than values for all recorded metrics and storing the value of the metric as a highest value in response to determining that the value of the metric exceeds the maximum property specified in the stack tier policy;
   computer usable program code for determining an average performance state value of the plurality of metrics in the virtualized process collection by calculating a divided by the weight property total in response to calculating a weight adjusted metric value for a plurality of metrics in the virtualized process collection; and
   computer usable program code for using the highest value as a performance state of the virtualized process collection in response to determining that the highest value is higher than the average performance state value of the plurality of metrics in the virtualized process collection.

8. The computer implemented method of claim 1, wherein determining a performance state value of a metric in a virtualized process collection using information in a stack tier policy further comprises:
   collecting the value for the metric in the virtualized process collection;
   responsive to determining that the metric is a critical metric, generating a critical policy violation signal if the value of the metric exceeds the maximum property specified in the stack tier policy;
   responsive to determining that the weight property in the stack tier policy is greater than 0, determining whether the limit property in the stack tier policy is greater than 0,
   if the limit property is not greater than 0, multiplying the weight property by the collected value of the metric to calculate the weight adjusted metric value; and
   if the limit property is greater than 0, dividing the collected value of the metric by the limit property to calculate a weight adjusted metric percentage value.

9. The computer implemented method of claim 1, wherein the weight property total is a sum of values of the weight properties for the plurality of metrics in the virtualized process collection.

* * * * *